US010669211B2

(12) United States Patent
Stolzenburg et al.

(10) Patent No.: US 10,669,211 B2
(45) Date of Patent: Jun. 2, 2020

(54) ACOUSTICALLY ACTIVE ARTICLES

(71) Applicant: 3M INNOVATIVE PROPERTIES COMPANY, St. Paul, MN (US)

(72) Inventors: Fabian Stolzenburg, Woodbury, MN (US); Qin Lin, Woodbury, MN (US); Noah O. Shanti, Maplewood, MN (US); Marc D. Radcliffe, Newport, MN (US); Ronald W. Gerdes, St. Paul, MN (US)

(73) Assignee: 3M INNOVATIVE PROPERTIES COMPNAY, St. Paul, MN (US)

( * ) Notice: Subject to any disclaimer, the term of this patent is extended or adjusted under 35 U.S.C. 154(b) by 0 days.

(21) Appl. No.: 16/064,501

(22) PCT Filed: Dec. 22, 2016

(86) PCT No.: PCT/US2016/068275
§ 371 (c)(1),
(2) Date: Jun. 21, 2018

(87) PCT Pub. No.: WO2017/116974
PCT Pub. Date: Jul. 6, 2017

(65) Prior Publication Data
US 2019/0016643 A1    Jan. 17, 2019

Related U.S. Application Data

(60) Provisional application No. 62/272,919, filed on Dec. 30, 2015.

(51) Int. Cl.
*C04B 35/14*    (2006.01)
*C04B 38/00*    (2006.01)
(Continued)

(52) U.S. Cl.
CPC .......... *C04B 38/0022* (2013.01); *C04B 35/14* (2013.01); *C04B 35/524* (2013.01);
(Continued)

(58) Field of Classification Search
CPC ....... C04B 35/14; C04B 35/52; C04B 35/524; C04B 38/0022; C04B 38/0067;
(Continued)

(56) References Cited

U.S. PATENT DOCUMENTS 5,522,282 A    6/1996  Nagano
5,874,126 A *  2/1999  Kahn .................... C04B 35/622
                                                    252/62.9 PZ
(Continued)

FOREIGN PATENT DOCUMENTS

EP          2424270       5/2014
JP          2011-199574   10/2011
(Continued)

OTHER PUBLICATIONS

US 8,594,357 B1, 11/2013, Lin (withdrawn)
(Continued)

*Primary Examiner* — Noah S Wiese
(74) *Attorney, Agent, or Firm* — Yufeng Dong

(57) ABSTRACT

Articles and methods of making and using the articles are provided. The articles include inorganic agglomerates having an average dimension in a range from about 50 microns to about 2 mm. The porous agglomerates each include a network of carbon or silica, and metal oxide particles embedded in the network. Some agglomerates are capable of lowering a resonant frequency of an acoustic device when the resonant frequency is in a range from about 50 Hz to about 1500 Hz.

19 Claims, 5 Drawing Sheets

(51) Int. Cl.
*C04B 35/524* (2006.01)
*H04R 1/28* (2006.01)
*C04B 35/63* (2006.01)
*C04B 35/634* (2006.01)
*C04B 111/92* (2006.01)
*H04R 29/00* (2006.01)

(52) U.S. Cl.
CPC ...... *C04B 35/6316* (2013.01); *C04B 35/6348* (2013.01); *C04B 35/63424* (2013.01); *C04B 35/63444* (2013.01); *C04B 35/63452* (2013.01); *C04B 38/0067* (2013.01); *H04R 1/2811* (2013.01); *C04B 2111/92* (2013.01); *C04B 2235/3217* (2013.01); *C04B 2235/3218* (2013.01); *C04B 2235/3244* (2013.01); *C04B 2235/44* (2013.01); *C04B 2235/48* (2013.01); *C04B 2235/483* (2013.01); *C04B 2235/5436* (2013.01); *C04B 2235/5445* (2013.01); *C04B 2235/96* (2013.01); *H04R 29/001* (2013.01); *H04R 2201/029* (2013.01); *H04R 2307/025* (2013.01)

(58) Field of Classification Search
CPC ............. C04B 38/0054; C04B 2111/92; C04B 2235/3218; C04B 2235/3217; C04B 2235/3244; C04B 2235/48; C04B 2235/483; C04B 2235/5436; C04B 2235/5445; C04B 2235/96
See application file for complete search history.

(56) References Cited

U.S. PATENT DOCUMENTS

| | | | |
|---|---|---|---|
| 7,953,240 | B2 | 5/2011 | Matsumura |
| 8,265,330 | B2 | 9/2012 | Fukunishi |
| 8,292,023 | B2 | 10/2012 | Slotte |
| 8,335,333 | B2 | 10/2012 | Saiki |
| 8,687,836 | B2 | 4/2014 | Lin |
| 8,767,998 | B2 | 7/2014 | Imamura |
| 8,794,373 | B1* | 8/2014 | Lin .................. B01D 53/0407 181/151 |
| 8,885,863 | B2 | 11/2014 | Takashima |
| 8,942,402 | B2 | 1/2015 | Yuasa |
| 2003/0109588 | A1* | 6/2003 | Schmidt ................ B01F 3/1214 516/20 |
| 2005/0227135 | A1 | 10/2005 | Chalkova |
| 2006/0211802 | A1 | 9/2006 | Asgari |
| 2011/0048844 | A1 | 3/2011 | Papakyriacou |
| 2012/0134909 | A1* | 5/2012 | Leventis ................ B82Y 30/00 423/439 |
| 2013/0170687 | A1 | 7/2013 | Papakyriacou |
| 2013/0170690 | A1 | 7/2013 | Backman |
| 2014/0254836 | A1 | 9/2014 | Tong |

FOREIGN PATENT DOCUMENTS

| | | |
|---|---|---|
| WO | 2011-151675 | 12/2011 |
| WO | 2013-083928 | 6/2013 |

OTHER PUBLICATIONS

Bechwati, "Low Frequency Sound Propagation in Activated Carbon," The Journal of The Acoustical Society of America, Jul. 2012, vol. 132, No. 1, pp. 239-248.

MELcat™ Zirconium Hydroxides, A Product Description from MEL Chemicals, [retrieved from the internet on Aug. 10, 2018], URL<http://www.zrchem.com/products/melcattm_zirconium_hydroxides.asp>, 4 pages.

Small, "Closed-Box Loudspeaker Systems—Part 1: Analysis", Journal Audio Engineering Society, Dec. 1972, vol. 20, No. 10, pp. 798-808.

International Search Report for PCT International Application No. PCT/US2016/068275, dated Mar. 24, 2017, 5 pages.

* cited by examiner

ACOUSTICALLY ACTIVE ARTICLES

CROSS REFERENCE TO RELATED APPLICATIONS

This application is a national stage filing under 35 U.S.C. 371 of PCT/US2016/068275, filed Dec. 22, 2016, which claims the benefit of U.S. Application No. 62/272,919, filed Dec. 30, 2015, the disclosure of which is incorporated by reference in its/their entirety herein.

TECHNICAL FIELD

The present disclosure relates to compositions of inorganic porous agglomerates and the methods of making and using the same as acoustically active articles.

BACKGROUND

Acoustic components of electronic devices such as speakers in handheld electronic devices have become smaller and smaller as the devices become thinner Small enclosure cavities in the devices make it difficult to achieve rich sounds in the low-frequency range. Acoustically active materials placed inside the speaker enclosure can help lower the resonant frequency of the device. The most commonly used materials currently are foams, fibers, zeolite and activated carbon.

SUMMARY

Briefly, in one aspect, the present disclosure describes an article including multiple porous inorganic agglomerates having an average dimension in a range from about 50 microns to about 2 mm. The porous inorganic agglomerates each includes a network of carbon or silica and metal oxide particles embedded in the network. In some embodiments, the network of carbon or silica is a pyrolysis product of a polymer binder at an elevated temperature in a range from 400 to 1000° C.

In another aspect, the present disclosure describes a method of forming an article including porous inorganic agglomerates. The method includes providing metal oxide powders having an average particle size in a range from 100 nm to 20 microns, mixing the metal oxide powders with one or more reactive monomers or polymers containing carbon or silicon and water to form a mixture, and polymerizing the mixture to form a plurality of composite beads. The composite beads each include the metal oxide powders distributed inside a polymeric binder, and the composite beads have an average size in a range from about 50 microns to about 2 mm. The composite beads are heated at an elevated temperature in a range from about 400 to about 1000° C. to form the porous inorganic agglomerates.

Various unexpected results and advantages are obtained in exemplary embodiments of the disclosure. One such advantage of exemplary embodiments of the present disclosure is that the agglomerates described herein are highly porous and hydrophobic, which is advantage over activated carbons which tend to be quite hydrophilic. Hydrophillicity can reduce the acoustic benefit in high humidity environments through saturation of active surface sites. In addition, the agglomerates described herein exhibit comparable acoustic properties as zeolites which on the other hand tend to be relatively expensive.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
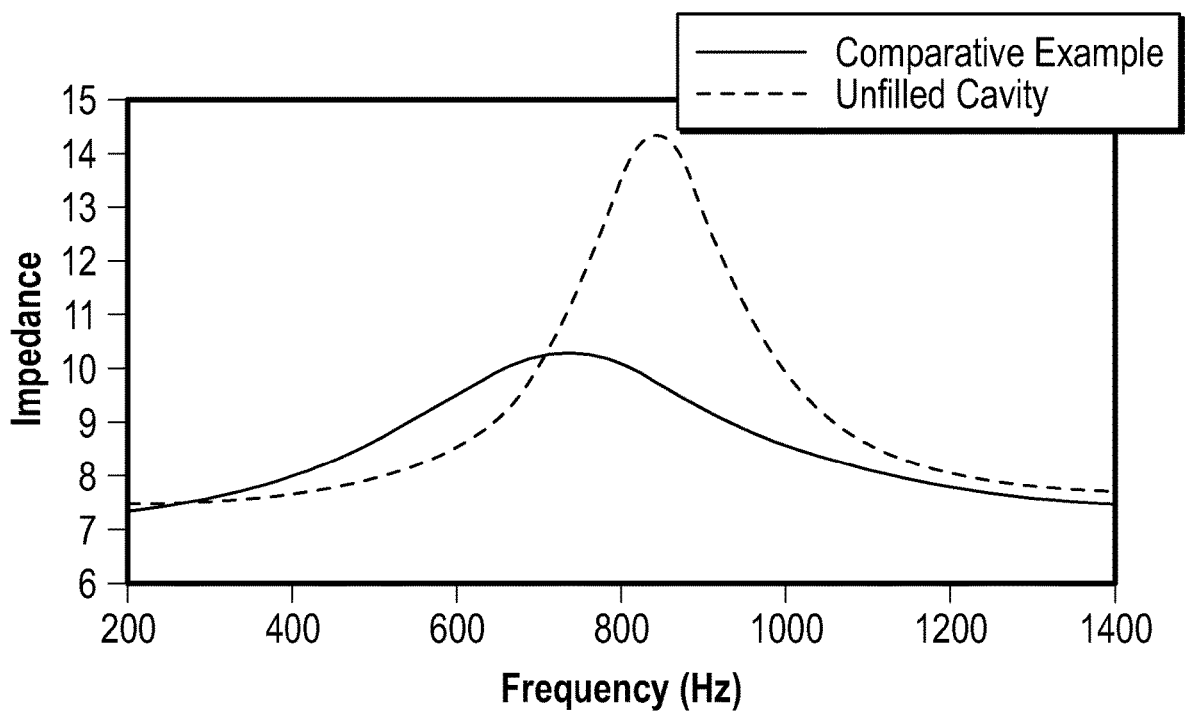
FIG. 1 illustrates plots of impedance test data for Comparative Example and an unfilled speaker.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

The term "homogeneous" means exhibiting only a single phase of matter when observed at a macroscopic scale.

The terms "(co)polymer" or "(co)polymers" includes homopolymers and copolymers, as well as homopolymers or copolymers that may be formed in a miscible blend, e.g., by mixing or by reaction. The term "copolymer" includes random, block and star (e.g. dendritic) copolymers.

The term "network of carbon or silica" refers to areas, whether interconnected or discrete, of carbon or silica connecting two or more particles without completely filling interstitial space between particles inside a porous inorganic agglomerate.

The term "metal oxide" refers to stoichiometric or nearly stoichiometric metal oxide, metal hydroxide, or metal hydride compounds. The metal may include any one or mix of metallic and semimetallic (e.g., Si, B, etc.) elements. The compound may be crystalline or amorphous.

The term "compound metal oxide" refers to stoichiometric or nearly stoichiometric metal oxide including any mix of two or more metallic and semimetallic elements. The compound may be crystalline or amorphous.

The term "complex metal oxide" refers to stoichiometric or nearly stoichiometric metal oxide including any metallic or semimetallic element in two or more oxidation states or any mix of two or more metallic and semimetallic elements. The compound may be crystalline or amorphous.

The term "compound transition metal oxide" refers to stoichiometric or nearly stoichiometric metal oxide including any mix of two or more transition metal elements (e.g. elements in groups 3-12 of the periodic table of elements). The compound may be crystalline or amorphous.

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

The terms "about" or "approximately" with reference to a numerical value or a shape means+/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The present disclosure describes compositions including porous inorganic agglomerates and the methods of making and using the same. The porous inorganic agglomerates have an average dimension in a range, for example, from about 50 microns to about 2 mm, from about 100 microns to about 1 mm, from about 250 microns to about 900 microns, or from about 400 microns to about 700 microns. The porous agglomerates each include a network of carbon or silica and metal oxide particles embedded in the network. Some inorganic agglomerates described herein are highly porous and hydrophobic, which is advantage over activated carbons that tend to be quite hydrophilic. Hydrophilicity can reduce the acoustic benefit in high humidity environments through saturation of active surface sites. In addition, the agglomerates described herein exhibit comparable acoustic properties as zeolites which on the other hand tend to be relatively expensive.

In some embodiments, the network of carbon or silica of a porous inorganic agglomerate described herein can be a pyrolysis product of a polymer binder at an elevated temperature in a range, for example, from 400 to 1000° C., from about 500 to about 1000° C., or from about 600 to about 900° C. The polymer binder can include, for example, one or more of vinyl, polystyrene, polyacrylonitrile, polyacrylate, phenolic, benzoxazine, silicone, and the combinations thereof.

In some embodiments, the metal oxide particles can be formed of metal oxide and/or metal hydroxide such as, for example, one or more of aluminum oxides, aluminum hydroxides, zirconium oxides, zirconium hydroxides, ferrous hydrates, compound transition metal oxides, etc. The metal oxide particles can have an average dimension, for example, in a range from about 100 nm to about 20 microns, or from about 500 nm to about 10 microns.

In some embodiments, the porous inorganic agglomerates can have a composition including, for example, from about 5 to about 25 weight %, or from about 10 to about 20 weight % carbon or silica, and from about 95 to about 75 weight %, or from about 90 to about 80 weight % metal oxide particles.

In some embodiments, the porous agglomerates have a packing density, for example, in a range from 0.05 to 1 g/cc, from 0.05 to 0.5 g/cc, from 0.1 to 0.6 g/cc, from 0.1 to 0.5 g/cc, or from 0.1 to 0.4 g/cc. In some embodiments, the packing density may be, for example, no greater than about 0.5 g/cc, no greater than about 0.48 g/cc, no greater than about 0.46 g/cc, no greater than about 0.45 g/cc, no greater than about 0.44 g/cc, no greater than about 0.42 g/cc, or no greater than about 0.40 g/cc. In some embodiments, the packing density may be, for example, no less than about 0.02 g/cc, no less than about 0.03 g/cc, no less than about 0.04 g/cc, no less than about 0.05 g/cc, no less than about 0.06 g/cc, no less than about 0.08 g/cc, or no less than about 0.1 g/cc.

In some embodiments, the porous agglomerates can include pores enclosed by the network of carbon or silica, and the average size of the pores can be in the range, for example, from about several nanometers to about 20 microns. In some embodiments, the porous agglomerates can include first and second groups of pores enclosed by the network of carbon or silica. The average size of the first group of pores can be in the range of, for example, from about 5 nm to about 100 nm, or from about 5 nm to about 50 nm. The average size of the second group of pores can be in the range of, for example, from about 100 nm to about 20 microns, from about 500 nm to about 10 microns, or from about 1 micron to about 10 microns.

In some embodiments, the porous agglomerates can have a composition that is substantially free of zeolites and activated carbon.

In some embodiments, the porous inorganic agglomerates are electrically insulative.

In some embodiments, the porous inorganic agglomerates are hydrophobic.

In some embodiments, the hydrophobic porous inorganic agglomerates can include a hydrophobic surface modification agent. The hydrophobic surface modification agent can include, for example, one or more silane or fluorine functional groups. The hydrophobic surface modification agent can be bound to, for example, from about 0.1% to about 50%, from about 0.5% to about 30%, or from about 1% to about 10% of the active surface sites of porous inorganic agglomerate.

The inorganic porous agglomerates described herein can have various applications including as an acoustically active material. In some embodiments, an acoustic device can be provided which contains the porous inorganic agglomerates in a cavity thereof. The porous inorganic agglomerates are capable of lowering a resonant frequency of the cavity when the resonant frequency is in a range, for example, from about 50 Hz to about 1500 Hz. In some embodiments, the porous inorganic agglomerates can be present in the cavity in the form of, for example, a film, a foam, or a fiber mat that can be electrically insulative and hydrophobic. The acoustic device can be, for example, a speaker, a microphone, etc., that can be used by an electronic device such as handheld electronic devices. The inorganic porous agglomerates described herein can also be used as an acoustically active material in medical devices, automobile devices, communication devices such as headsets, audio-video devices, etc.

The present disclosure also describes methods of making inorganic porous agglomerates described herein. In some embodiments, metal oxide powders can be mixed with one or more reactive monomers or polymers containing carbon or silicon and mixed with water to form a mixture. The metal oxide powders can have an average particle size in a range, for example, from 100 nm to 20 microns, or from about 500 nm to about 10 microns. The reactive monomers or polymers can include, for example, (i) one or more of styrene and derivatives, vinyl ester monomer(s), acrylate monomer(s), methyl acrylate(s), acrylonitrile, multi carbon double bond monomer(s), and (ii) one or more of monomer(s) that are polymerizable to form a polymer with a high char yield in nitrogen gas and semi-aromatic or aromatic polymers or oligomers with a high char yield in nitrogen gas.

In some embodiments, the reactive monomers or polymers can include a first type of monomers or polymers, and a second type of monomers or polymers. The first type of monomers or polymers can be chemical compounds with one or more carbon double bonds that can be polymerized by, for example, a free radical initiator. It may be mixture of vinyl monomers. The first type of monomers or polymers may include, for example, one or more of styrene and derivatives, vinyl ester monomer(s), acrylate monomer(s), methyl acrylate(s), acrylonitrile, multi carbon double-bond monomer, etc. The second type of monomers or polymers may include, for example, carbon and/or silicon which may serve as inorganic carbon or silica binders for metal oxide powders in inorganic porous agglomerates described herein. The sources of carbon binders can include (i) monomer(s) that can polymerize to form a polymer with a high char yield in nitrogen gas, including for example, acrylonitrile, phenolic resin, melamine resin, epoxy, etc.; and/or (ii) semi-aromatic or aromatic polymers or oligomers with a high char yield in nitrogen gas, including for example, aromatic polyesters, aromatic polycarbonate, polyimide, poly(arylene ether), etc. The silica source can include (i) any silicon containing monomer that can polymerize to form a polymer including for example, silicone based methacrylate, styrene, acrylate, silane or products of silane condensation reaction, etc.; (ii) silicone resins including for example, to polyhedral oligomeric silsesquioxane (POSS), t-resin and Q-resin, etc.; and/or (iii) silicone containing polymers, including for example, polyacrylates, polystyrenes, poly(methyl methacrylate)s, polyesters, polyamides, polycarbonates, polyimides, poly(arylene ether), etc.

In some embodiments, the metal oxide powders can be treated with a surface treatment agent before mixing with the monomers/polymers and water. The surface treatment agent is configured to change the hydrophilic surface of metal oxide powders to be hydrophobic. Exemplary surface treatment agents can include silane or fluorine functional groups. It is to be understood that any suitable surface treatment agents may be used which may depend on the specific type of metal oxide.

In some embodiments, the metal oxide can be mixed with monomers/polymers to form an oil phase. The oil phase can include, for example, a mixture of (i) 5 to 30 wt % of metal oxide powders, and (ii) 5 to 95 wt % of the reactive monomers or polymers containing carbon or silicon. The oil phase can then be mixed with a water phase that includes water and optional surfactant or stabilizer. The ratio of the water phase to the oil phase can be, for example, between 10:1 and 1:1 by weight, or between 5:1 and 1:1 by weight. The water phase can include a surfactant or stabilizer, for example, in the concentration from about 0.1 to about 15 wt %, from about 0.1 to about 10 wt %, or from about 0.5 to about 5 wt %.

The mixture of the oil phase and the water phase can be polymerized to form composite beads. Various polymerization processes can be used, including, for example, curing by radiation (e.g., UV light), by heating at an elevated temperature or even at room temperature. Suitable additives such as a free radical initiator can be added into the oil phase, the water phase, or the mixture thereof to facilitate the polymerization.

The formed composite beads each include the metal oxide powders distributed inside a polymeric binder which can include, for example, vinyl, polystyrene, polyacrylonitrile, polyacrylate, phenolic, benzoxazine, and silicone. The composite beads have an average size in a range, for example, from about 50 microns to about 2 mm. Then, the composite beads can be heated at an elevated temperature in a range, for example, from about 400 to about 1000° C., from about 500 to about 1000° C., or from about 600 to about 900° C. to form the porous inorganic agglomerates.

In some embodiments, the porous inorganic agglomerates described herein may include no substantial amount of zeolite or activated carbon, for example, less than about 10 wt %, less than about 5 wt %, less than about 1 wt %, less than about 0.5 wt %, less than about 0.1 wt %, or less than about 0.01 wt %. In some embodiments, the porous inorganic agglomerates may include carbon created by pyrolysis of polymers, which is hydrophobic and different from hydrophilic activated carbon.

In some embodiments, the porous inorganic agglomerates can be further treated with a hydrophobic surface modification agent to further increase hydrophobicity. Exemplary hydrophobic surface modification agents can include silane or fluorine functional groups. The hydrophobic surface modification agent can be bound to, for example, from about 0.1% to about 50%, from about 0.5% to about 30%, or from about 1% to about 10% of the active surface sites of porous inorganic agglomerate. It is to be understood that any suitable hydrophobic surface modification agents may be used which may depend on the specific type of metal oxide.

An exemplary polymerization system and process for making porous inorganic agglomerates is described below. The polymerization system includes an oil phase and a water phase. The oil phase may include:

Component 1: monomer(s) including chemical compounds with one or more carbon double bonds that can be polymerized by a free radical initiator. Component 1 may be a mixture of vinyl monomers. In some embodiments, Component 1 may contain one or more of the following monomers:

A) Styrene and derivatives, including but not limited to: 4-acetoxystyrene, 4-benzhydrylstyrene, 4-benzyloxy-3-methoxystyrene, 2-bromostyrene, 3-bromostyrene, 4-bromostyrene, α-bromostyrene, 4-tert-butoxystyrene, 4-tert-butylstyrene, 4-chloro-α-methylstyrene, 2-chlorostyrene, 3-chlorostyrene, 4-chlorostyrene, 2,6-dichlorostyrene, 2,6-difluorostyrene, 3,4-dimethoxystyrene, 2,4-dimethylstyrene, 2,5-dimethylstyrene, N,N-dimethylvinylbenzylamine, 2,4-diphenyl-4-methyl-1-pentene, 4-(diphenylphosphino)styrene, 4-ethoxystyrene, 2-fluorostyrene, 3-fluorostyrene, 4-fluorostyrene, 2-isopropenylaniline, 3-isopropenyl-α,α-dimethylbenzyl isocyanate, 4-[N-(methylaminoethyl)aminomethyl]styrene, methylstyrene, α-methylstyrene, 3-nitrostyrene, pentafluorophenyl 4-vinylbenzoate, 2,3,4,5,6-pentafluorostyrene, 2-(trifluoromethyl)styrene, 3-(trifluoromethyl)styrene, 4-(trifluoromethyl)styrene, 2,4,6-trimethylstyrene, 3-vinylaniline, 4-vinylanisole, 9-vinylanthracene, 4-vinylbenzocyclobutene, 4-vinylbenzoic acid, vinylbenzyl chloride, (vinylbenzyl)trimethylammonium chloride, 4-vinylbiphenyl, and 2-vinylnaphthalene, etc.

B) Vinyl ester monomer(s), including but not limited to: vinyl acetate, vinyl benzoate, vinyl 4-tert-butylbenzoate, vinyl chloroformate, vinyl cinnamate, vinyl decanoate, vinyl neodecanoate, vinyl pivalate, vinyl propionate, vinyl stearate, vinyl trifluoroacetate and vinyl valerate, etc.

C) Acrylate monomer(s), including but not limited to: 4-acetoxyphenethyl acrylate, 4-acryloylmorpholine, 2-(4-benzoyl-3-hydroxyphenoxy)ethyl acrylate, benzyl 2-propylacrylate, n-butyl acrylate, tert-butyl acrylate, 2-[[(butylamino)carbonyl]oxy]ethyl acrylate, tert-butyl 2-bromoacrylate, 4-tert-butylcyclohexyl acrylate, 2-carboxyethyl acrylate oligomers, 2-chloroethyl acrylate, 2-(diethylamino)ethyl acrylate, di(ethylene glycol) ethyl ether acrylate, di(ethylene glycol) 2-ethylhexyl ether acrylate, 3-(dimethylamino)propyl acrylate, 3-(dimethylamino)propyl acrylate, ethyl acrylate, ethyl 2-(bromomethyl)acrylate, ethyl cis-(β-cyano)acrylate, ethylene glycol dicyclopentenyl ether acrylate, ethylene glycol methyl ether acrylate, ethyl 2-ethylacrylate, 2-ethylhexyl acrylate, 2-hydroxy-3-phenoxypropyl acrylate, isobornyl acrylate, isobutyl acrylate, isodecyl acrylate, isooctyl acrylate, lauryl acrylate, methyl 2-acetamidoacrylate, methyl α-bromoacrylate, methyl acrylate, methyl 2-(bromomethyl)acrylate, octadecyl acrylate, pentabromobenzyl acrylate, tetrahydrofurfuryl acrylate, and 2-tetrahydropyranyl acrylate, etc.

D) Methyl acrylate(s), including but not limited to: allyl methacrylate, benzyl methacrylate, butyl methacrylate, tert-butyl methacrylate, 9H-carbazole-9-ethylmethacrylate, 3-chloro-2-hydroxypropyl methacrylate, cyclohexyl methacrylate, 2-(diethylamino)ethyl methacrylate, diethylene glycol butyl ether methacrylate, di(ethylene glycol) methyl ether methacrylate, 2-(diisopropylamino)ethyl methacrylate, 2-(dimethylamino)ethyl methacrylate, 2-ethoxyethyl methacrylate, 2-ethoxyethyl methacrylate, ethylene glycol dicyclopentenyl ether methacrylate, ethylene glycol methyl ether methacrylate, ethylene glycol phenyl ether methacrylate, 2-ethylhexyl methacrylate, ethyl methacrylate, furfuryl methacrylate, glycidyl methacrylate, hexyl methacrylate, hydroxybutyl methacrylate, 2-hydroxyethyl methacrylate, 2-Hydroxypropyl 2-(methacryloyloxy)ethyl phthalate, isobornyl methacrylate, isobutyl methacrylate, isodecyl methacrylate, lauryl methacrylate, methacrylic acid N-hydroxysuccinimide ester, methyl methacrylate, mono-2-(methacryloyloxy)ethyl maleate, 2-N-morpholinoethyl methacrylate, 1-naphthyl methacrylate, pentabromophenyl methacrylate, 1,4-phenylene dimethacrylate, tetrahydrofurfuryl methacrylate, 2-[(1',1',1'-Trifluoro-2'-(trifluoromethyl)-2'-hydroxy)propyl]-3-norbornyl methacrylate, 3,3,5-Trimethylcyclohexyl methacrylate, etc.

E) Multi carbon double-bond monomer(s), which can serve as crosslinker (preferably divinyl benzene) including but not limited to: divinyl benzene, bisphenol A ethoxylate diacrylate, bisphenol F ethoxylate (2 EO/phenol) diacrylate, bisphenol A dimethacrylate, bis(2-methacryloyl)oxyethyl disulfide, 1,3-butanediol diacrylate, 1,4-butanediol diacrylate, 1,3-butanediol dimethacrylate, 1,4-butanediol dimethacrylate, di(trimethylolpropane) tetraacrylate, glycerol propoxylate (1PO/OH) triacrylate, 1,6-hexanediol diacrylate, 1,6-hexanediol dimethacrylate, 1,6-hexanediol ethoxylate diacrylate, neopentyl glycol diacrylate, pentaerythritol diacrylate monostearate, pentaerythritol tetraacrylate, poly(propylene glycol) diacrylate, poly(propylene glycol) dimethacrylate, 1,3,5-triacryloylhexahydro-1,3,5-triazine, tricyclo[5.2.1.0]decanedimethanol diacrylate, trimethylolpropane ethoxylate (1 EO/OH) methyl ether diacrylate, trimethylolpropane ethoxylate triacrylate, trimethylolpropane ethoxylate triacrylate, trimethylolpropane triacrylate, trimethylolpropane trimethacrylate, tris[2-(acryloyloxy)ethyl]isocyanurate, di- or multi-functional urethane acrylates, etc.

The oil phase may further include:

Component 2: acoustically active metal oxide(s) which may include, for example, aluminum hydroxide, aluminum oxide, silicon oxide, silicate, zirconium oxide, zirconium hydroxide, iron ferrihydrate, or other metal oxides, compound metal oxide, complex metal oxides, hydroxides, and hydrates.

The oil phase may further include:

Component 3: Source(s) for the inorganic binder. The binder(s) may include be carbon, silica, or other metal oxide(s).

The source(s) of carbon binder can be a monomer(s) that polymerizes to form a polymer with a high char yield in nitrogen gas, including but not limited to acrylonitrile, phenolic resin, melamine resin and epoxy, etc., or semi-aromatic or aromatic polymers or oligomers with a high char yield in nitrogen gas, including but not limited to aromatic polyesters, aromatic polycarbonate, polyimide, poly(arylene ether), etc. The silica source can be any silicon containing monomer that polymerizes to form a polymer including but not limited to silicone based methacrylate, styrene, acrylate, silane or products of silane condensation reaction; silicone resins including but not limited to polyhedral oligomeric silsesquioxane (POSS), t-resin and Q-resin; or silicone containing polymers, including but not limited to, polyacrylates, polystyrenes, poly(methyl methacrylate)s, polyesters, polyamides, polycarbonates, polyimides, poly(arylene ether), etc.

The water phase of the polymerization system may include:

Component 1: Deionized water; and

Component 2: 0-15 wt % surfactant(s) or stabilizer(s) (preferably polyvinyl alcohol), which can be ionic or nonionic including but not limited to: polyvinyl alcohol (PVA), polyvinylpyrrolidone (PVP), alginic acid sodium salt, ALKANOL® 189-S surfactant, Capstone® FS-66, glycolic acid ethoxylate 4-tert-butylphenyl ether, glycolic acid ethoxylate lauryl ether, glycolic acid ethoxylate 4-nonylphenyl ether, glycolic acid ethoxylate oleyl ether, poly(ethylene glycol) 4-nonylphenyl 3-sulfopropyl ether potassium salt, Adogen® 464, ALKANOL® family surfactants, Brij® family surfactants, di(ethylene glycol) hexyl ether, 2,5-dimethyl-3-hexyne-2,5-diol, ethylenediamine tetrakis(ethoxylate-block-propoxylate) tetrol, IGEPAL® family surfactants, MERPOL® family surfactants, poly(ethylene glycol)-block-poly(propylene glycol)-block-poly(ethylene glycol), poly(ethylene glycol) sorbitan tetraoleate, poly(ethylene glycol) sorbitol hexaoleate, poly(ethylene glycol) tridecyl ether, polyethylene-block-poly(ethylene glycol), sorbitan monopalmitate, 2,4,7,9-tetramethyl-5-decyne-4,7-diol ethoxylate, Triton™ family surfactants, 1-dodecanoyl-sn-glycero-3-phosphocholine, 3-(4-tert-butyl-1-pyridinio)-1-propanesulfonate, 3-(N,N-Dimethylmyristylammonio)propanesulfonate, 3-(1-pyridinio)-1-propanesulfonate, 3-(benzyldimethylammonio)propanesulfonate, 3-(decyldimethylammonio)propanesulfonate inner salt, 3-(N,N-Dimethyloctylammonio)propanesulfonate, and 3-[N,N-Dimethyl(3-palmitoylaminopropyl)ammoniol-propanesulfonate, etc.

In some embodiments, the stabilizer may include a viscosity modifier, for example, a gelling agent (such as sodium borate), coagulant, cellulose, saccharide, gum (such as xanthan gum), silicone, acrylic/acrylate/acrylamide copolymer, etc.

In some embodiments, surfactant(s) or stabilizer(s) may optionally be added to the oil phase instead of, or in addition to, the water phase.

In some embodiments, additives can be added into the polymerization system to facilitate the polymerization. The additives can include, for example, one or more free radical initiators which can be loaded in the oil phase or the water phase.

In some embodiments, one or more free radical initiators can be included in the oil phase, and the polymerization system can be referred to suspension polymerization. An exemplary free radical initiator is azobisisobutyronitrile (AIBN). In some embodiments, the free radical initiator can decompose when exposed to heat (thermal initiator) or UV light (UV initiator). A single free radical initiator or combination of initiators may be used. Thermal initiators may include, for example, azo family and peroxide family, such as, azobisisobutyronitrile, 2,2'-Azobis(4-methoxy-2,4-dimethyl valeronitrile), 2,2'-azobis(2,4-dimethyl valeronitrile), dimethyl 2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamidel, 1-[(1-cyano-1-methylethyl)azolformamide, 2,2'-azobis(N-butyl-2-methylpropionamide), 2,2'-Azobis(N-cyclohexyl-2-methylpropionamide, tert-butyl hydroperoxide, tert-butyl peracetate, cumene hydroperoxide, 2,5-Di(tert-butylperoxy)-2,5-dimethyl-3-hexyne, dicumyl peroxide, Luperox® family initiators, 2,5-bis(tert-butylperoxy)-2,5-dimethylhexane, 2,4-pentanedione peroxide, 1,1-bis(tert-butylperoxy)-3,3,5-trimethylcyclohexane, 1,1-bis(tert-butylperoxy), 1,1-bis(tert-amylperoxy), benzoyl peroxide, 2,2,4-trimethyl-1,3-pentanediol diisobutyrate, tert-butyl peroxide, lauroyl peroxide and tert-butyl peroxybenzoate, etc. UV initiators may include, for example, 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzoin, benzoin ethyl ether, 4,4'-dimethoxybenzoin, 4,4'-dimethylbenzil, benzophenone, benzophenone-3,3',4,4'-tetracarboxylic dianhydride, 4-benzoylbiphenyl, 4,4'-bis(diethylamino)benzophenone, 4,4'-bis[2-(1-propenyl)phenoxy]benzophenone, 4-(diethylamino)benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, Michler's ketone, diphenyl(2,4,6-trimethylbenzoyl) phosphine oxide, phenylbis(2,4,6-trimethylbenzoyl) phosphine oxide, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, mixture of 2- and 4-isomers and thioxanthen-9-one, etc.

In some embodiments, one or more free radical initiators can be included in the water phase, and the polymerization system is referred to dispersion polymerization or soap free emulsion polymerization. The free radical initiators may include, for example, azo or peroxide. Azo water soluble initiators may include, for example, 2,2'-azobis[2-(2-imidazolin-2-yl)propane]dihydrochloride, 2,2'-azobis[2-(2-imidazolin-2-yl)propane]disulfate dehydrate, 2,2'-azobis(2-methylpropionamidine)dihydrochloride, 2,2'-azobis[N-(2-carboxyethyl)-2-methylpropionamidinelhydrate, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(1-imino-1-pyrrolidino-2-ethylpropane)dihydrochloride, 2,2'-azobis{2-methyl-N-[1,1-bis(hydroxymethyl)-2-hydroxyethl]propionamide} and 2,2'-azobis[2-methyl-N-(2-hydroxyethyl)propionamide], etc.

It is to be understood in the above described polymerization systems, the components may be mixed in various orders. In some embodiments, a homogenous water phase can be added to a homogenous oil phase which includes one or more initiators.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

LISTING OF EXEMPLARY EMBODIMENTS

It is to be understood any one of embodiments 1-14, 15-19, 20-30 and 31-33 can be combined.

Embodiment 1 is an article comprising:
a plurality of porous inorganic agglomerates having an average dimension in a range from about 50 microns to about 2 mm, the porous agglomerates each including a network of carbon or silica, and metal oxide particles embedded in the network.

Embodiment 2 is the article of embodiment 1, wherein the network of carbon or silica is a pyrolysis product of a polymer binder at an elevated temperature in a range from 400 to 1000° C.

Embodiment 3 is the article of embodiment 2, wherein the polymer binder includes one or more of vinyl, (poly)styrene, (poly)acrylonitrile, (poly)acrylate, phenolic, benzoxazine, melamine resin, epoxy, and silicone.

Embodiment 4 is the article of any one of embodiments 1-3, wherein the metal oxide particles include aluminum oxide or hydroxide.

Embodiment 5 is the article of any one of embodiments 1-3, wherein the metal oxide particles include one or more of zirconium oxide, zirconium hydroxide, ferrous hydrate, or compound transition metal oxide.

Embodiment 6 is the article of any one of embodiments 1-5 comprising about 5 to about 25 wt % carbon or silica, and about 95 to about 75 wt % metal oxide particles.

Embodiment 7 is the article of any one of embodiments 1-6, wherein the porous agglomerates have a packing density in a range from 0.05 to 1.0 g/cc.

Embodiment 8 is the article of any one of embodiments 1-7, wherein the metal oxide particles have an average dimension in a range from about 100 nm to about 20 microns.

Embodiment 9 is the article of any one of embodiments 1-8, comprising no substantial amount of zeolite or activated carbon.

Embodiment 10 is the article of any one of embodiments 1-9, wherein the porous inorganic agglomerates are electrically insulative.

Embodiment 11 is the article of any one of embodiments 1-10, wherein the porous inorganic agglomerates are hydrophobic.

Embodiment 12 is the article of embodiment 11, wherein the hydrophobic porous inorganic agglomerates include a hydrophobic surface modification agent.

Embodiment 13 is the article of embodiment 12, wherein the hydrophobic surface modification agent includes a silane or fluorine functional groups.

Embodiment 14 is the article of embodiment 12 or 13, wherein the hydrophobic surface modification agent is bound to a range from about 0.1% to about 50% of the active surface sites of porous inorganic agglomerate.

Embodiment 15 is an acoustic device comprising a cavity and the article of any one of the preceding embodiments received by the cavity, wherein the porous inorganic agglomerates are capable of lowering a resonant frequency of the cavity when the resonant frequency is in a range from about 50 Hz to about 1500 Hz.

Embodiment 16 is an acoustic device comprising a transducer in the presence of a cavity, and the article of any one of embodiments 1-14 received by the cavity, wherein the porous inorganic agglomerates have an effective bulk modulus less than the bulk modulus of air.

Embodiment 17 is an acoustic device comprising a transducer in the presence of a cavity, and the article of any one of embodiments 1-14 received by the cavity, wherein the porous inorganic agglomerates have an effective bulk modulus less than about 100,000 Pa.

Embodiment 18 is the acoustic device of any one of embodiments 15-17, wherein the porous inorganic agglomerates are present in the form of a film, a foam, or a fiber mat.

Embodiment 19 is the acoustic device of any one of embodiments 15-18, which is a speaker.

Embodiment 20 is a method of forming an article including porous inorganic agglomerates, the method comprising:
providing metal oxide powders having an average particle size in a range from 100 nm to 20 microns;
mixing the metal oxide powders with one or more reactive monomers or polymers containing carbon or silicon and water to form a mixture;
polymerizing the mixture to form a plurality of composite beads, the composite beads each comprising the metal oxide powders distributed inside a polymeric binder, and the composite beads having an average size in a range from about 50 microns to about 2 mm; and
heating the composite beads at an elevated temperature in a range from about 400 to about 1000° C. to form the porous inorganic agglomerates.

Embodiment 21 is the method of embodiment 20, wherein the reactive monomers or polymers comprise (i) one or more of styrene and derivatives, vinyl ester monomer(s), acrylate monomer(s), methyl acrylate(s), acrylonitrile, and multi carbon double-bond monomer(s), and (ii) one or more of monomer(s) that are polymerizable to form a polymer with a high char yield in nitrogen gas, and semi-aromatic or aromatic polymers or oligomers with a high char yield in nitrogen gas.

Embodiment 22 is the method of embodiment 20 or 21, wherein mixing the metal oxide powders further comprises mixing the metal oxide into an oil phase, wherein the oil phase comprises a mixture of (i) 5 to 30 wt % of metal oxide powders, (ii) sufficient amount (e.g., 0.05 to 5 wt %) of a free radical initiator, and (iii) 5 to 95 wt % of the reactive monomers or polymers containing carbon or silicon.

Embodiment 23 is the method of embodiment 22, wherein mixing the metal oxide powders further comprises mixing the oil phase with a water phase, wherein the water phase comprises water, the ratio of the water phase to the oil phase is between 10:1 to 1:1 by weight.

Embodiment 24 is the method of any one of embodiments 20-23, further comprising treating the metal oxide powders with a surface treatment agent before mixing the metal oxide powders.

Embodiment 25 is the method of embodiment 24, wherein the surface treatment agent comprises silane or fluorine functional groups.

Embodiment 26 is the method of any one of embodiments 20-25, wherein polymerizing the mixture comprises curing the mixture by radiation or heat.

Embodiment 27 is the method of any one of embodiments 20-26, wherein the polymer binder includes one or more of vinyl, polystyrene, polyacrylonitrile, polyacrylate, phenolic, benzoxazine, melamine resin, epoxy, and silicone.

Embodiment 28 is the method of any one of embodiments 20-27, further comprising treating the porous inorganic agglomerates with a hydrophobic surface modification agent.

Embodiment 29 is the method of embodiment 28, wherein the hydrophobic surface modification agent includes one or more of silane or fluorine functional groups.

Embodiment 30 is the method of embodiment 28 or 29, wherein the hydrophobic surface modification agent is bound to a range from about 0.1% to about 50% of the active surface sites of the porous inorganic agglomerates.

Embodiment 31 is a composition for forming acoustically active agglomerate beads, the composition comprising:

an oil phase comprising a mixture of (i) 5 to 30 wt % of metal oxide powders, and (ii) 5 to 95 wt % of one or more reactive monomers or polymers containing carbon or silicon; and a water phase comprising about 85 to about 100 wt % of water, wherein the oil phase and the water phase are mixed, and the ratio of the water phase to the oil phase is between 10:1 to 1:1 by volume.

Embodiment 32 is the composition of embodiment 31, further comprises a sufficient amount (e.g., 0.05 to 5 wt %) of a free radical initiator.

Embodiment 33 is the composition of embodiment 31 or 32, wherein the water phase further comprises 0 to 15 wt % of a surfactant or stabilizer.

Embodiment 34 is the composition of any one of embodiments 31-33, wherein the reactive monomers or polymers comprise (i) one or more of styrene and derivatives, vinyl ester monomer(s), acrylate monomer(s), methyl acrylate(s), acrylonitrile, and multi carbon double-bond monomer(s), and (ii) one or more of monomer(s) that are polymerizable to form a polymer with a high char yield in nitrogen gas, and semi-aromatic or aromatic polymers or oligomers with a high char yield in nitrogen gas.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

| Material designation | Description | Source |
|---|---|---|
| V-250 | Aluminum hydroxide | obtained from UOP LLC, Des Plaines, IL under trade designation "VERSAL ALUMINA V-250" |
| VGL-25 | γ-alumina | obtained from UOP LLC, Des Plaines, IL under trade designation "VERSAL ALUMINA VGL-25" |
| (3-acryloxypropyl)trimethoxy silane | | obtained from Gelest, Inc., Morrisville, PA |
| 3-(trimethoxysilyl)propyl methacrylate | | obtained from Sigma-Aldrich Chemical Company, St. Louis, MO |
| Styrene | Styrene | |
| DVB | Divinyl benzene | |
| AN | Acrylonitrile | |
| AIBN | 2,2'-Azobis(2-methylpropionitrile) | |
| PVA | poly(vinyl alcohol) average Mw 85,000-124,000, 87-89% hydrolyzed, 23-27 cP, 4% in $H_2O$ | |
| Toluene | | |
| Methanol | | |
| Styrene2 | Styrene | obtained from Alfa Aesar, Ward Hill, MA, catalog # A18481 |
| DVB2 | Divinyl benzene, 80% | obtained from Alfa Aesar, Ward Hill, MA, catalog # 42804-36 |
| AN2 | Acrylonitrile | obtained from INEOS USA LLC, Lima, OH |
| PVP | Polyvinylpyrrolidone, Mw 50,000 | obtained from Acros Organics, Morris Plains, NJ, catalog # 227545000 |
| PVOH | poly(vinyl alcohol) average Mw 85,000-124,000, 87-89% hydrolyzed | obtained from Kuraray, Pasadena, TX under trade Designation Poval 26-88 |
| VAZO 67 | | obtained from DuPont, Willington, DE |
| EcoSurf SA7 | | obtained from Dow Chemical Company, Midland, MI |

| Material designation | Description | Source |
|---|---|---|
| Trimethoxy(4-vinylphenyl)silane | | obtained TCI America, Portland, OR |
| POSS | Polyhedral Oligomeric Silsesquioxane methacrylate | obtained from Hybrid Plastics, Hattiesburg, MS under trade designation "POSS MA0735" |
| 20x50GG | Activated carbon | obtained from Kurary Kabushiki Kaisha, Japan |
| Ethyl Acetate | | obtained from JT Baker, Phillipsburg, NJ |
| A-174NT | 3-methacryloxypropyl trimethoxysilane | obtained from Momentive Performance Materials, Inc., Waterford, NY under trade designation "Silquest A-174NT" |
| 1-(Trimethoxysilyl)octane | | obtained from Chem-Impex International, Wood Dale, IL |
| Ethanol | 200 Proof Pure Ethanol | obtained from Decon Labs, King of Prussia, PA under trade name "Koptec Pure Ethanol - 200 Proof" |
| Ammonium Hydroxide | | obtained from EMD Millipore, Billerica, MA |

Methods:

Method for Impedance Test

The resonance frequency (RF) graphs were obtained using standard Thiele-Small parameter analysis described in Small, R. H., "Closed-Box Loudspeaker Systems", J. Audio Eng. Soc., vol. 20, pp. 798-808 (December 1972) of a Knowles Electronics 2403-260-00001 11×15×3.5 mm speaker connected to a 0.93 cubic centimeter cavity. A DATS V2 Dayton Audio Test System (available from Dayton Audio, Springboro, Ohio 45066) was attached to the speaker and run to collect the resonant frequency peak in the audio range (20-20,000 Hz). This resonant frequency was collected for the speaker in contact with unfilled 0.93 cc cavity, and compared to the system resonance with the cavity filled with the test material.

Method for Sound Pressure Level (SPL) Test

To evaluate the effectiveness of each cavity-filling material, a sound pressure level (SPL) response test was conducted driving a Knowles Electronics model 2403-260-00001 speaker that was mounted to a fixture that provided a back volume air cavity. The air cavity volume was approximately 0.93 cc. The driving voltage was approximately 0.4 mVrms which was supplied in the form of a band-limited chirp from 0-3200 Hz. The voltage profile was identical for each material tested, and was generated by an HP model 35670 frequency analyzer (available from Keysight Technologies, Santa Rosa, Calif.). This frequency analyzer was also used to record the SPL from a Bruel and Kjaer type 4188-A-03 condenser microphone (available from Bruel & Kjaer, Norcross, Ga.) that was positioned approximately 2.54 cm from the fixture.

Preparative Example 1

Preparation of (3-acryloxypropyl) trimethoxy silane Surface Functionalized Alumina Powder In a 1 L jar, 125 g V-250 was dry-milled using 5 mm, yttria-stabilized zirconia (YSZ) milling media (1 kg) for 4 hours at 100 rpm giving an alumina powder with an average particle size of about 1 micron. The milled powder was then heated in alumina crucibles to 750° C. for 1 hour. In a 1 liter single neck flask, 100 g of the processed V-250 was added to 100 g (3-acryloxypropyl) trimethoxy silane and 200 g toluene. The mixture was mechanically stirred and heated to 50° C. for 16 hours. After cooling, the powder was collected by filtration, washed with methanol, and dried in a vacuum oven at 60° C. for 24 h.

Preparative Example 2

Preparation of 3-(trimethoxysilyl)propyl methacrylate Surface Functionalized Alumina Powder In a 1 L jar, 125 g V-250 was dry-milled using 5 mm, yttria-stabilized zirconia (YSZ) milling media (1 kg) for 4 hours at 100 rpm giving an alumina powder with an average particle size of ~1 μm. The milled powder was then heated in alumina crucibles to 750° C. for 1 hour. In a 1 liter single neck flask, 100 g of the processed V-250 was added to 100 g 3-(trimethoxysilyl)propyl methacrylate and 200 g toluene. The mixture was mechanically stirred and heated to 50° C. for 16 hours. After cooling, the powder was collected by filtration, washed with methanol, and dried in a vacuum oven at 60° C. for 24 h.

Preparative Example 2a

Preparation of 3-methacryloxypropyl trimethoxysilane Surface Functionalized Alumina Powder In a 4-L stainless steel beaker, 1200 g of ethyl acetate was mixed using a Ross Lab Model ME100 L round hole rotor-stator mixer at speed setting 3, and VGL-25 alumina was added slowly over about 1.5 minutes. Mixing was continued until a uniform slurry was obtained (total 4.0 minutes mixing time). The resulting slurry was transferred to a 3 L 3-neck round bottom flask set up with mechanical agitation and a temperature probe. While stirring (about 150 rpm), 99.6 g of A-174NT was added slowly. The resulting mixture was heated to 70° C. for 16 hours, then cooled to room temperature. The solids were collected by vacuum filtration using a Buchner funnel and Whatman Qualitative 4 filter paper. The solids were washed with methanol and dried in a batch oven at 70° C. for 13.5 hours.

Comparative Example

20×50 GG carbon granules were used as a Comparative Example. The density of the carbon granules was 0.37 g/cc.

Figure 2:
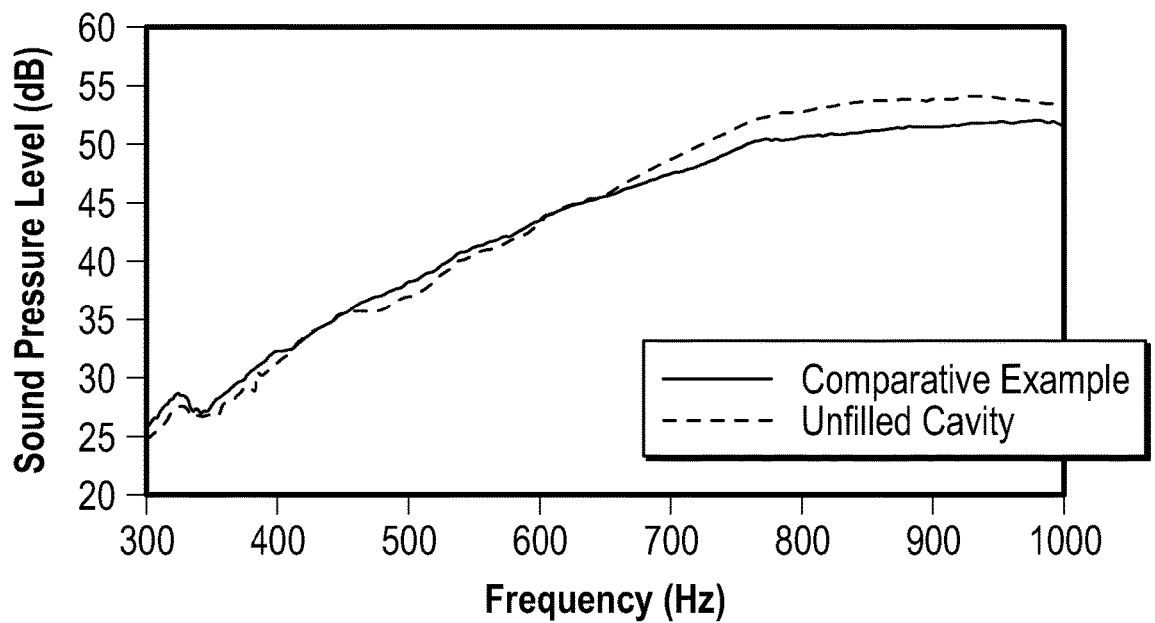
FIG. 2 illustrates plots of sound pressure level (SPL) test data for Comparative Example and the unfilled speaker of FIG. 1.

Carbon granules of the Comparative Example were tested according to the Method for Impedance Test and Method for Sound Pressure Level (SPL) Test described above. The resonance frequency shift measured by the Method for Impedance Test was 100 Hz lower and the average SPL improvement between 300 and 600 Hz was 0.8 dB as measured by the Method for Sound Pressure Level Test as shown in FIGS. 1 and 2, respectively.

Example 3

Preparation of Alumina/Carbon Beads

In a 500 ml three neck flask with mechanical stir and condenser, 10 g surface functionalized alumina powders from Preparative Example 1 was loaded with 12 g styrene, 8 g DVB, 6 g AN, and 0.3 g AIBN. This oil phase was stirred to form a homogeneous dispersion, and then 150 g water solution with 0.225 g PVA was added. The viscosity of the system increased dramatically, and the stir speed was raised to 1400 rpm. The system was heated to 80° C. for 5 hours. The agglomerates were allowed to precipitate and the supernatant was removed. The agglomerates were washed by water twice, and dried at room temperature overnight. The washed, dried agglomerates were then fired in alumina crucibles in flowing $N_2$ for 2 hours at 900° C. to form the alumina/carbon composite beads. The beads were sieved to retain 600-710 microns and had a bulk density of 0.35 g/cc.

Figure 3:
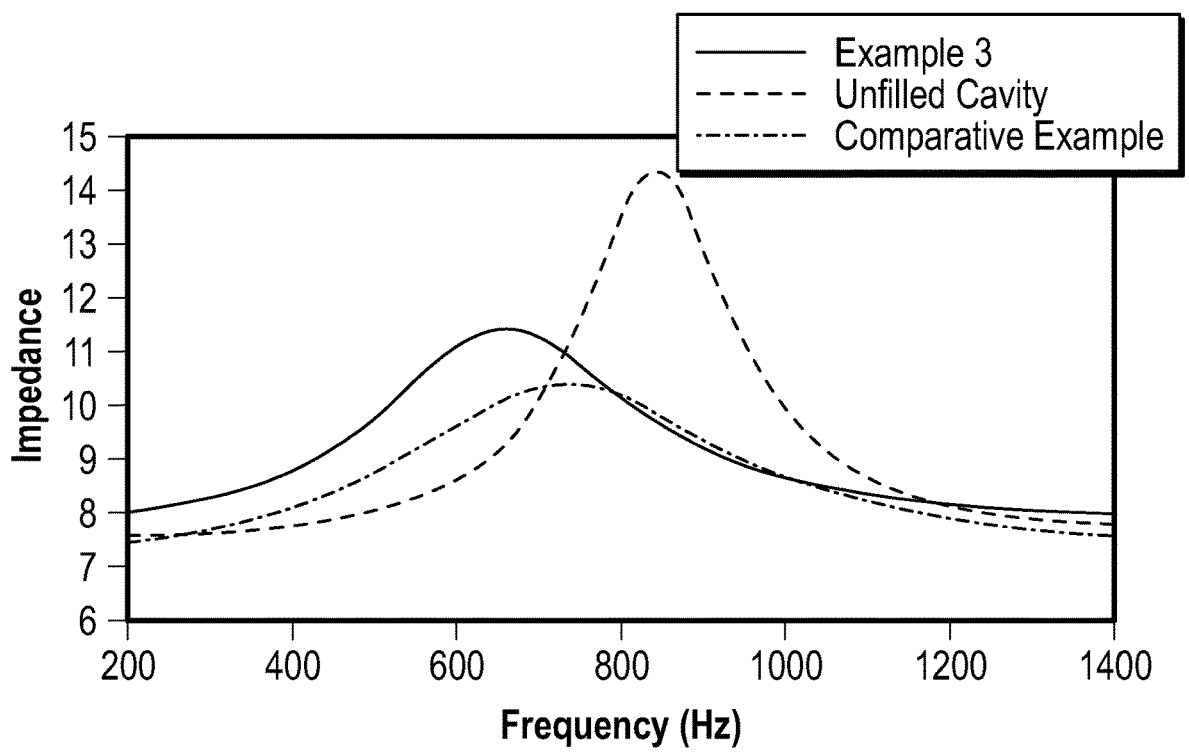
FIG. 3 illustrates plots of impedance test data for Example 3, Comparative Example and an unfilled speaker.
Figure 4:
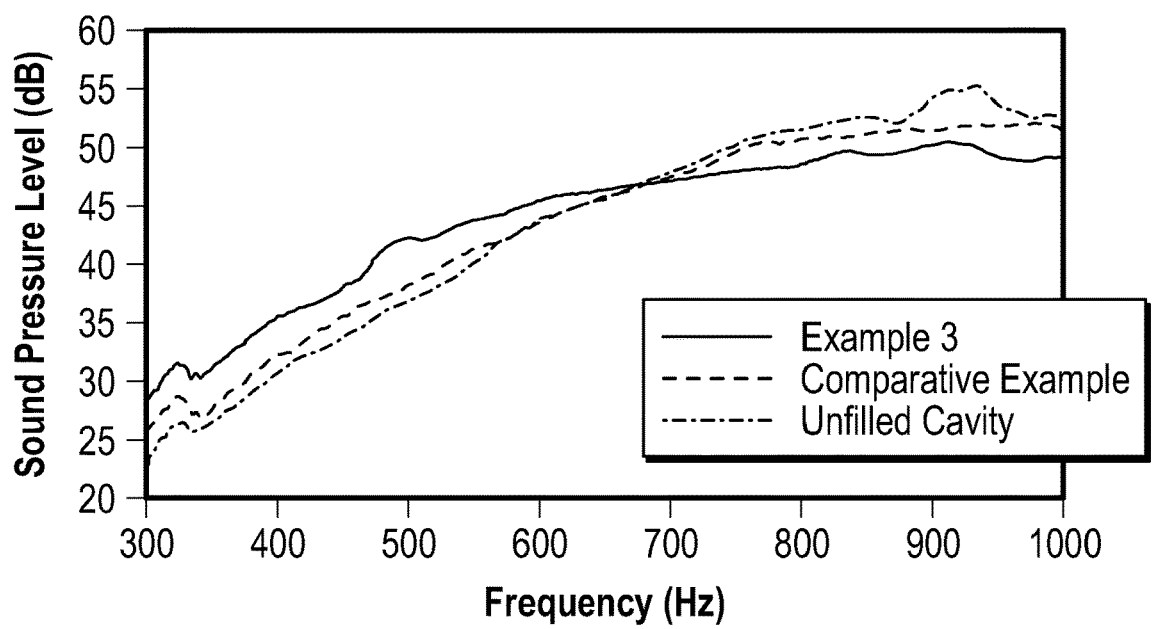
FIG. 4 illustrates plots of sound pressure level (SPL) test data for Example 3, and the unfilled speaker of FIG. 3.

The beads of Example 3 were tested according to the Method for Impedance Test and Method for Sound Pressure Level (SPL) Test described above. The resonance frequency shift measured by the Method for Impedance Test was 180 Hz lower and the average SPL improvement between 300 and 600 Hz was 4.3 dB as measured by the Method for Sound Pressure Level Test as shown in FIGS. 3 and 4, respectively.

Figure 9:
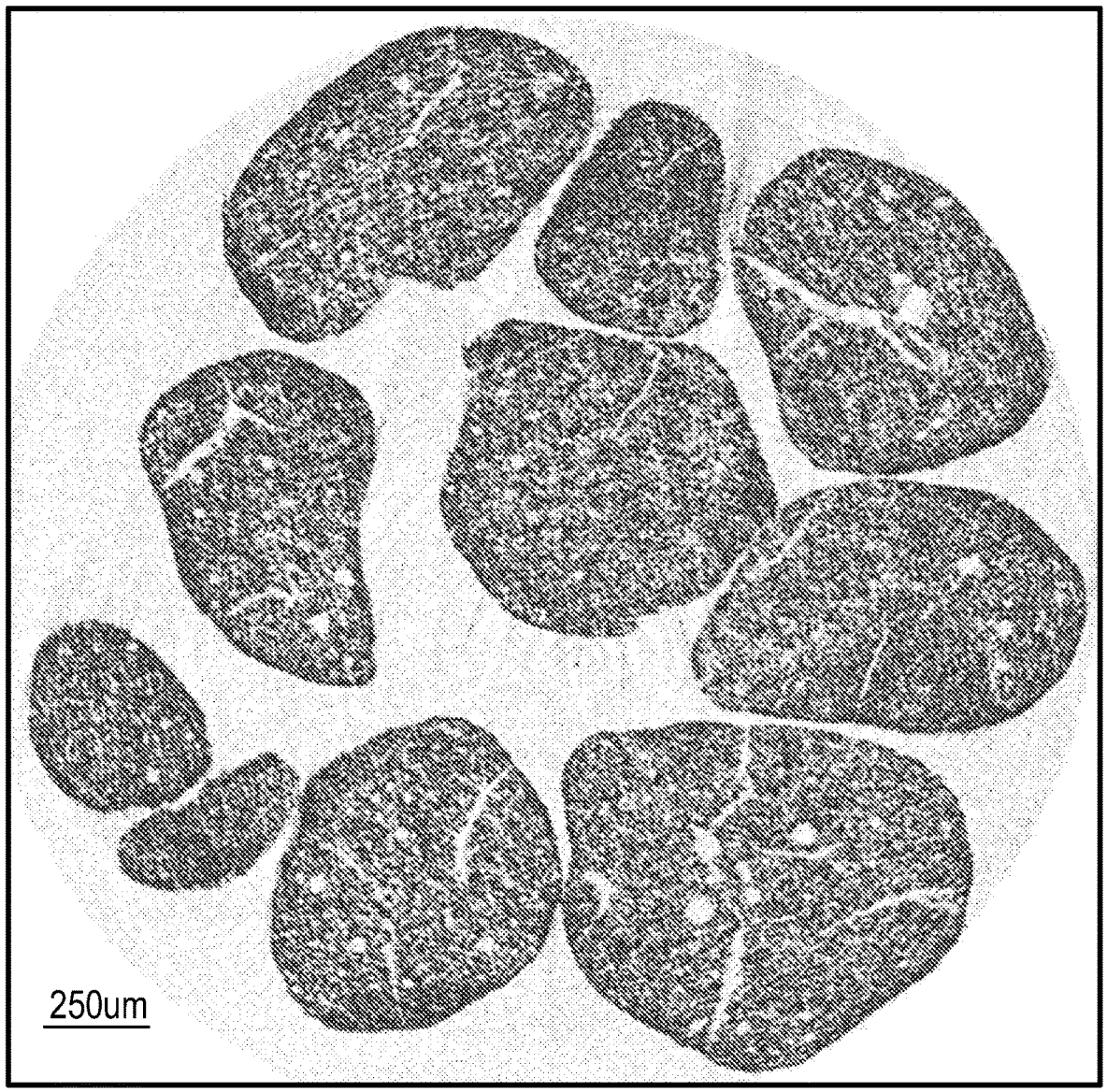
FIG. 9 illustrates an X-ray Computed Tomography (XRCT) image of Example 3.

An X-ray computed tomography (XRCT) image of Example 3 is shown in FIG. 9. The XRCT image corresponds to the appearance of Example 3 when sliced and exposed along a slice plane. The darkness in the image corresponds to X-ray attenuation, the proportion of X-rays scattered or absorbed as they pass through the sample. X-ray attenuation may be a function of density and composition of the material being imaged. The porous beads of Example 3 contained homogeneous distribution of alumina and carbon. Some beads also contained clustered lumps of alumina.

Example 4

Preparation of Alumina/Silica Beads

In a 500 ml three neck flask with mechanical stir and condenser, 12 g surface functionalized alumina powders from Preparative Example 1 was loaded with 17 g DVB, 16 g trimethoxy(4-vinylphenyl)silane, and 0.3 g AIBN. This oil phase was stirred to form a homogeneous dispersion, and then 150 g water solution with 0.225 g PVA was added. The viscosity of the system increased dramatically, and the stir speed was raised to 1000 rpm. The system was heated to 80° C. for 6 hours. The agglomerates were allowed to precipitate and the supernatant was removed. The agglomerates were washed by water twice, and dried at room temperature overnight. The washed and dried agglomerates were then fired in alumina crucibles in flowing air for 2 hours at 700° C. to form the alumina/silica composite beads. The beads were sieved to retain 600-710 microns and had a bulk density of 0.40 g/cc.

Figure 5:
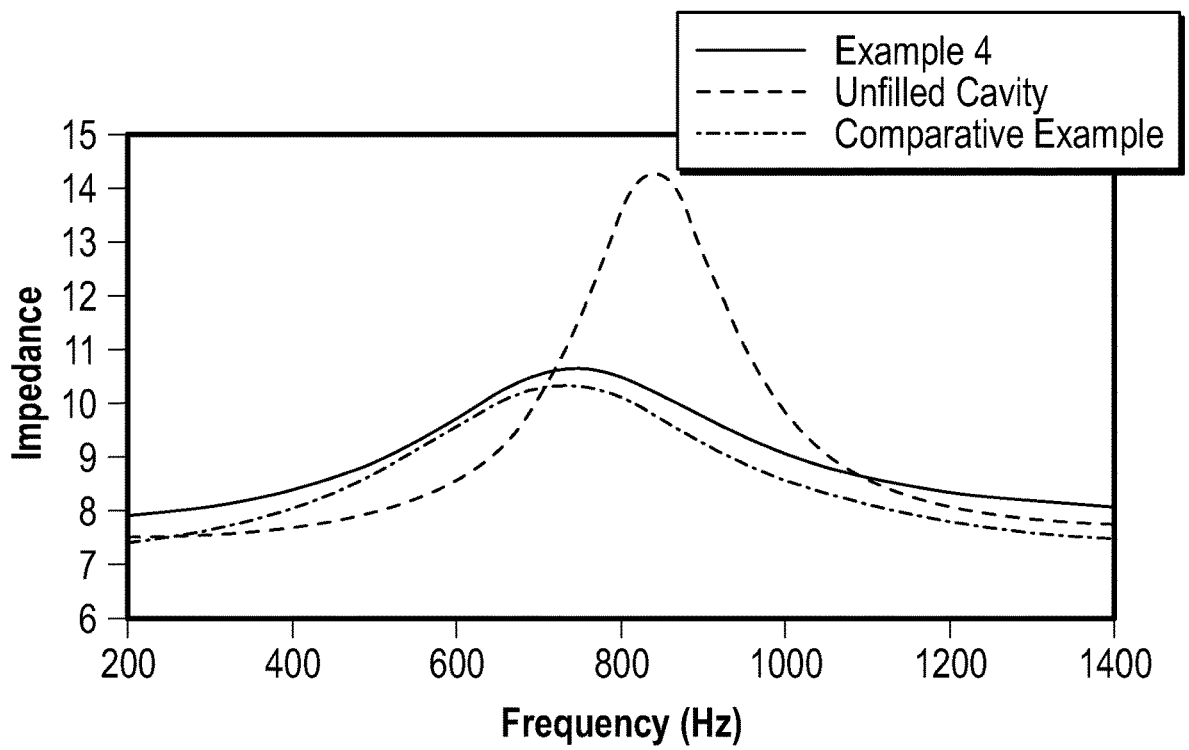
FIG. 5 illustrates plots of impedance test data for Example 4, Comparative Example and an unfilled speaker.
Figure 6:
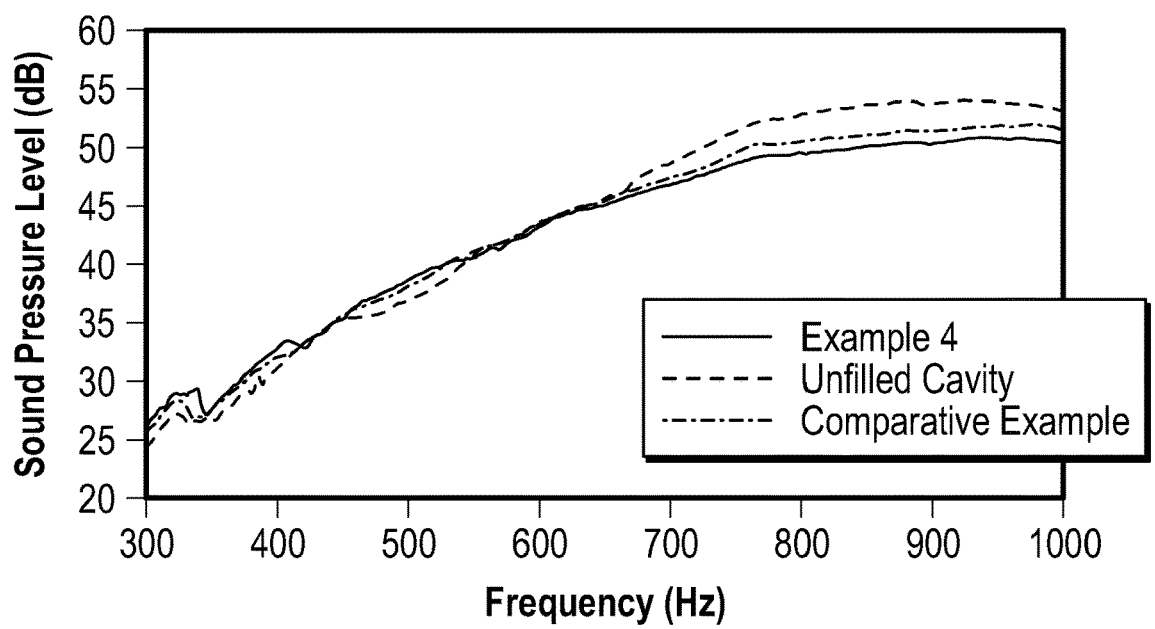
FIG. 6 illustrates plots of sound pressure level (SPL) test data for Example 4, and the unfilled speaker of FIG. 5.

The beads of Example 4 were tested according to the Method for Impedance Test and Method for Sound Pressure Level (SPL) Test described above. The resonance frequency shift measured by the Method for Impedance Test was 90 Hz lower and the average SPL improvement between 300 and 600 Hz was 1.0 dB as measured by the Method for Sound Pressure Level Test as shown in FIGS. 5 and 6, respectively.

Example 5

Preparation of Alumina/Carbon/Silica Beads

In a 500 ml three neck flask with mechanical stir and condenser, 11.2 g surface functionalized alumina powders from Preparative Example 2 was loaded with 15 g DVB, 0.8 g POSS, 12 g styrene, 6 g AN, and 0.5 g AIBN. This oil phase was stirred to form a homogeneous dispersion, and then 150 g water solution with 0.225 g PVA was added. The viscosity of the system increased dramatically, and the stir speed was raised to 1200 rpm. The system was heated to 80° C. for 6 hours. The agglomerates were allowed to precipitate and the supernatant was removed. The agglomerates were washed by water twice, and dried at room temperature overnight. The washed and dried agglomerates were then fired in alumina crucibles in flowing $N_2$ for 2 hours at 900° C. to form the alumina/carbon/silica composite beads. The beads were sieved to retain 600-710 microns and had a bulk density of 0.34 g/cc.

Figure 7:
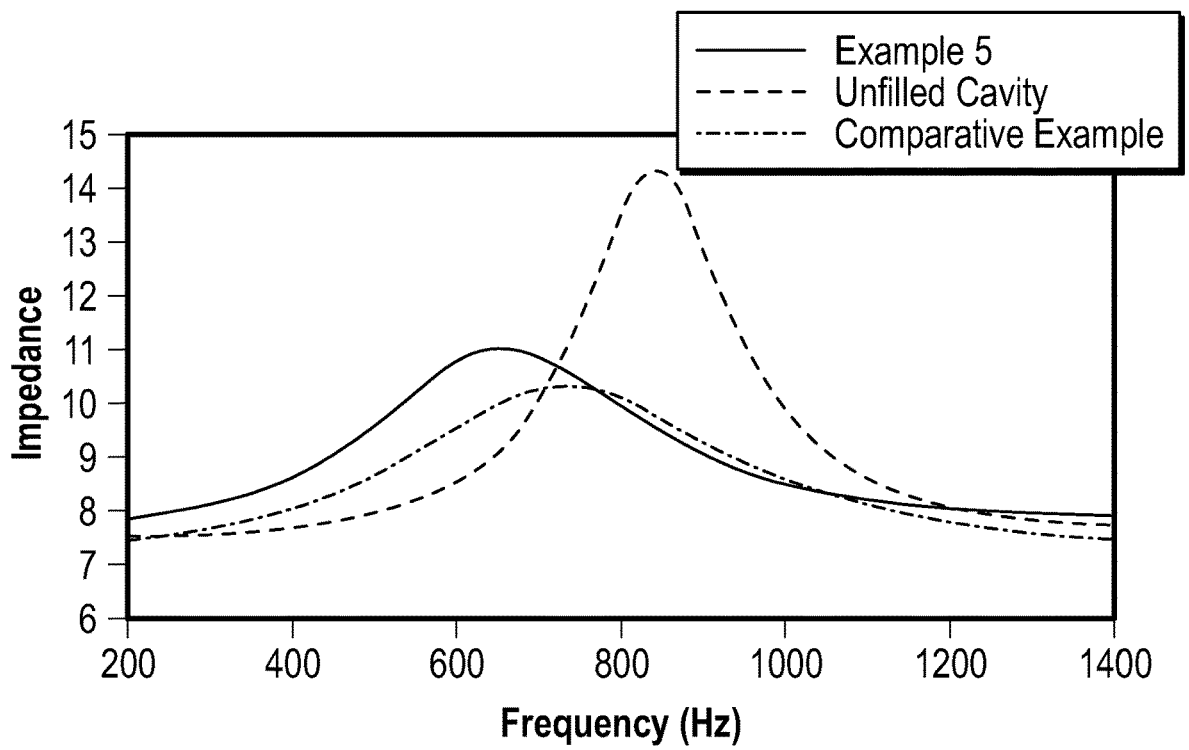
FIG. 7 illustrates plots of impedance test data for Example 5, Comparative Example and an unfilled speaker.
Figure 8:
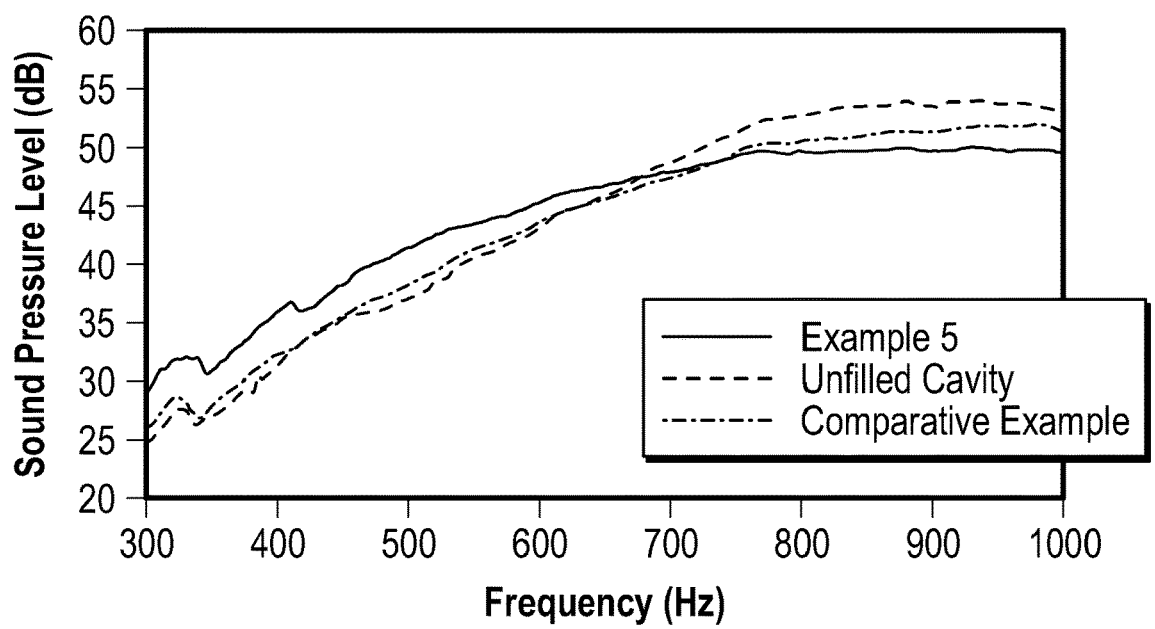
FIG. 8 illustrates plots of sound pressure level (SPL) test data for Example 5, and the unfilled speaker of FIG. 7.

Example 5 beads were tested according to the Method for Impedance Test and Method for Sound Pressure Level (SPL) Test described above. The resonance frequency shift measured by the Method for Impedance Test was 185 Hz lower and the average SPL improvement between 300 and 600 Hz was 3.7 dB as measured by the Method for Sound Pressure Level Test as shown in FIGS. 7 and 8, respectively.

Example 5a

Preparation of Alumina/Carbon/Silica Beads

DI water (920 g), 100 g of a 1% (w/w) aqueous solution of PVOH, and 5 g of solid PVP were charged to a half gallon jar and stirred with a magnetic stirrer until the PVP was dissolved. Ecosurf SA-7 (1 g) was then added to the jar and mixed with magnetic stirring. To a 2 L split resin flask was charged 28 g AN2, 60 g styrene2, 59 g DVB2, 3 g POSS, 2 g VAZO 67, and 56 g functionalized alumina powder from Preparative Example 2a. The flask was secured with a 3-neck head equipped with an over stirrer, thermocouple, and condenser. The aqueous premix was then charged to oil phase in the flask, and the stir speed was set to 500 rpm for 45 min under nitrogen purge. The system was heated from 25 C to 80 C at a rate of 1 C degree per minute, then held at 80 C for 2 h under 500 rpm. The contents were allowed to cool to room temperature, and the agglomerates were allowed to precipitate before the supernatant was removed. The agglomerates were washed by water twice, and dried at room temperature overnight. The washed and dried agglomerates were then fired in alumina crucibles in flowing $N_2$ for 2 hours at 900° C. to form the alumina/carbon/silica composite beads. The beads were sieved to retain 250-850 microns and had a bulk density of 0.36 g/cc.

Example 5a alumina/carbon/silica beads were tested according to the Method for Impedance Test described above. The resonance frequency shift measured by the Method for Impedance Test was 120 Hz lower.

Example 6

Preparation of Surface Modified Alumina/Carbon/Silica Beads

In a 250 mL glass jar, 0.41 g 1-(Trimethoxysilyl)octane, 0.2 mL of ammonium hydroxide, 40 mL of ethanol, and 40 mL of water were mixed. To this mixture, 1.5 g of Example 5a alumina/carbon/silica beads were added, and the mixture was heated to 60° C. and held overnight. The supernatant was removed and surface modified alumina/carbon/silica beads were washed with ethanol and dried at room temperature overnight. This produced a theoretical coverage of 10% of the active surface sites.

Example 5a alumina/carbon/silica beads and Example 6 surface modified alumina/carbon/silica beads were tested according to the Method for Impedance Test described above. The resonance frequency shift measured by the Method for Impedance Test was 120 Hz lower for the alumina/carbon/silica beads of Example 5a and 115 Hz lower for the surface modified alumina/carbon/silica beads of Example 6.

Example 5a alumina/carbon/silica beads and Example 6 surface modified alumina/carbon/silica beads were then exposed to 85° C. and 85% relative humidity environment for 120 hours and retested according to the Method for Impedance Test described above. After the high temperature and humidity exposure, the resonance frequency shift measured by the Method of Impedance Test was 60 Hz lower for the exposed alumina/carbon/silica beads of Example 5a and 111 Hz lower for the exposed surface modified alumina/carbon/silica beads of Example 6.

The test data for the above Examples and Comparative Examples are summarized in Table 1 below.

TABLE 1

| | Material | Resonance frequency shift (Hz) | SPL improvement between 300 and 600 Hz (dB) | Bulk density (g/cc) |
| --- | --- | --- | --- | --- |
| Comparative Example | Carbon granules | −100 | 0.8 | 0.37 |
| Example 3 | alumina/carbon beads | −180 | 4.3 | 0.35 |
| Example 4 | alumina/silica beads | −90 | 1.0 | 0.40 |
| Example 5 | Alumina/Carbon/Silica Beads | −185 | 3.7 | 0.34 |
| Example 5a | Alumina/Carbon/Silica Beads | −120 | | 0.36 |
| Example 5a after humidity exposure | | −60 | | |

TABLE 1-continued

| | Material | Resonance frequency shift (Hz) | SPL improvement between 300 and 600 Hz (dB) | Bulk density (g/cc) |
| --- | --- | --- | --- | --- |
| Example 6 | Surface Modified Alumina/Carbon/Silica Beads | −115 | | |
| Example 6 after humidity exposure | | −111 | | |

Effective Bulk Modulus Analysis

The measured frequency shift was analyzed in terms of effective bulk modulus for the fluid in the speaker back cavity. Frequency shift is dependent on the dimensions of the back cavity and the mechanical properties for the speaker diaphragm. Bulk modulus, on the other hand, is an intrinsic property for a fluid, in this case the fluid that fills the back cavity. When an acoustically active material is added to this back cavity, the effective bulk modulus is lowered. Thus by calculating effective bulk modulus, it is possible to apply the measured results to other speakers and back cavities.

The effective bulk moduli for the above Examples were calculated according to the following formula (1):

$$B_{\mathit{eff}} = \frac{t}{A} M((2\pi f_{active})^2 - (2\pi f_{seal})^2) + B_0 \quad (1)$$

where, $M$=the diaphragm mass $B_0$=the bulk modulus of the fluid (normally just air)

$A$=the surface area of the diaphragm $t$=depth of the back cavity $f_{active}$=resonant frequency for the filled-cavity case $f_{seal}$=resonant frequency for the sealed, unfilled-cavity case Using the unfilled natural frequency measurement and the open natural frequency measurement, the diaphragm mass, M, was calculated from the following formula (2):

$$M = \frac{B_0 A / t}{(2\pi f_{unfilled})^2 - (2\pi f_{open})^2} \quad (2)$$

where, $f_{open}$ resonant frequency for the speaker only with no cavity present For all cited examples, $f_{open}$=468 Hz, and the unfilled natural frequency was measured to be 841 Hz, resulting in a calculated diaphragm mass of 0.088 g, per the above formula.

Then using the bulk modulus formula, effective bulk moduli were calculated for the examples cited. The area of the speaker diaphragm, A, was assumed to be equal to the area of the cavity touching the speaker, 105 mm2. The cavity depth, t, was 8.85 mm. Bulk modulus for air at standard temperature and pressure, $B_0$, is 142,355 Pa. The results are summarized in Table 2 below.

TABLE 2

| Example | Filled resonant frequency (Hz) | Effective Bulk modulus (Pa) |
|---|---|---|
| Example 3 | 664 | 64,418 |
| Example 4 | 745 | 97,809 |
| Example 5 | 663 | 64,030 |
| Example 5a | 722 | 88,079 |
| Example 5a after humidity exposure | 727 | 90,199 |
| Example 6 | 782 | 114,490 |
| Example 6 after humidity exposure | 731 | 91,906 |
| Comparative Example | 724 | 88,784 |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An article comprising:
a plurality of porous inorganic agglomerates having an average dimension in a range from about 50 microns to about 2 mm, the porous inorganic agglomerates each including a network of carbon or silica, and metal oxide particles embedded in the network,
wherein the article comprises 5 to 25 wt % carbon or silica, and 95 to 75 wt % metal oxide particles.

2. The article of claim 1, wherein the network of carbon or silica is a pyrolysis product of a polymer binder which is heated at an elevated temperature in a range from 400 to 1000° C.

3. The article of claim 2, wherein the polymer binder includes one or more of vinyl, (poly)styrene, (poly)acrylonitrile, (poly)acrylate, phenolic, benzoxazine, melamine resin, epoxy, and silicone.

4. The article of claim 1, wherein the metal oxide particles include aluminum oxide or hydroxide.

5. The article of claim 1, wherein the metal oxide particles include one or more of zirconium oxide, zirconium hydroxide, ferrous hydrate, or compound transition metal oxide.

6. The article of claim 1, wherein the porous agglomerates have a packing density in a range from 0.05 to 1.0 g/cc.

7. The article of claim 1, wherein the metal oxide particles have an average dimension in a range from about 100 nm to about 20 microns.

8. The article of claim 1, comprising no substantial amount of zeolite.

9. The article of claim 1, wherein the porous inorganic agglomerates are electrically insulative.

10. The article of claim 1, wherein the porous inorganic agglomerates are hydrophobic.

11. An acoustic device comprising a transducer in the presence of a cavity, and the article of claim 1, the article being received by the cavity, wherein the porous inorganic agglomerates are capable of lowering a resonant frequency of the acoustic device when the resonant frequency is in a range from about 50 Hz to about 1500 Hz, and the porous inorganic agglomerates have an effective bulk modulus less than the bulk modulus of air or less than about 100,000 Pa.

12. The acoustic device of claim 11, wherein the porous inorganic agglomerates are present in the form of a film, a foam, or a fiber mat.

13. The acoustic device of claim 11, which is a speaker.

14. A method of forming an article including porous inorganic agglomerates, the method comprising:
providing metal oxide powders having an average particle size in a range from 100 nm to 10 microns;
mixing the metal oxide powders with one or more reactive monomers or polymers containing carbon or silicon and water to form a mixture;
polymerizing the mixture to form a plurality of composite beads, the composite beads each comprising the metal oxide powders distributed inside a polymeric binder, and the composite beads having an average size in a range from about 50 microns to about 2 mm; and
heating the composite beads at an elevated temperature in a range from about 400 to about 1000° C. to form the porous inorganic agglomerates,
wherein the article comprises:
the porous inorganic agglomerates having an average dimension in a range from about 50 microns to about 2 mm, the porous inorganic agglomerates each including a network of carbon or silica, and metal oxide particles embedded in the network,
wherein the article comprises 5 to 25 wt % carbon or silica, and 95 to 75 wt % metal oxide particles.

15. The method of claim 14, wherein the reactive monomers or polymers comprise (i) one or more of styrene and derivatives, vinyl ester monomer(s), acrylate monomer(s), methyl acrylate(s), acrylonitrile, and multi carbon double-bond monomer(s), and (ii) one or more of monomer(s) that are polymerizable to form a polymer with a high char yield in nitrogen gas, and semi-aromatic or aromatic polymers or oligomers with a high char yield in nitrogen gas.

16. The method of claim 14, wherein mixing the metal oxide powders further comprises mixing the metal oxide into an oil phase, wherein the oil phase comprises a mixture of (i) 5 to 30 wt % of metal oxide powders, (ii) sufficient amount of a free radical initiator, and (iii) 5 to 95 wt % of the reactive monomers or polymers containing carbon or silicon.

17. The method of claim 16, wherein mixing the metal oxide powders further comprises mixing the oil phase with a water phase, wherein the water phase comprises water, the ratio of the water phase to the oil phase is between 10:1 to 1:1 by weight.

18. The method of claim 14, further comprising treating the metal oxide powders with a surface treatment agent before mixing the metal oxide powders.

19. The method of claim 18, wherein the surface treatment agent comprises silane or fluorine functional groups.

* * * * *

UNITED STATES PATENT AND TRADEMARK OFFICE
CERTIFICATE OF CORRECTION

PATENT NO. : 10,669,211 B2  
APPLICATION NO. : 16/064501  
DATED : June 2, 2020  
INVENTOR(S) : Fabian Stolzenburg Page 1 of 1

It is certified that error appears in the above-identified patent and that said Letters Patent is hereby corrected as shown below:

On the Title Page

Column 1 (Assignee)
Line 2, Delete "COMPNAY," and insert -- COMPANY, --, therefor.

In the Specification

Column 1
Line 22, After "thinner" insert -- . --.
Line 60, Delete "Hydrophillicity" and insert -- Hydrophilicity --, therefor.

Column 3
Line 29, Delete "means+/-" and insert -- means +/- --, therefor.

Column 8
Line 26, Delete "iron ferrihydrate," and insert -- iron ferrihydrite, --, therefor.

Column 9
Line 40, Delete "-methylpropionamidel," and insert -- -methylpropionamide], --, therefor.
Line 41, Delete "azolformamide," and insert -- azo]formamide, --, therefor.

Column 10
Lines 1-2, Delete "3-me thylbenzophenone," and insert -- 3-methylbenzophenone, --, therefor.
Line 24, Delete "-hydroxyethl]" and insert -- -hydroxyethyl] --, therefor.

Columns 15-16
Line 8 (Table), Delete "Kurary" and insert -- Kuraray --, therefor.

Column 16
Line 59, Delete "ME100 L" and insert -- ME100L --, therefor.

Signed and Sealed this  
Twelfth Day of January, 2021

Andrei Iancu  
*Director of the United States Patent and Trademark Office*